July 31, 1951
V. C. SHAW
2,562,746
ADJUSTABLE MITER GAUGE.
Filed March 8, 1950
2 Sheets—Sheet 1
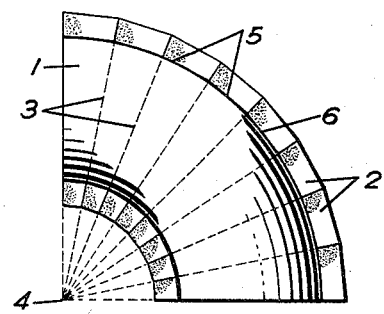
*INVENTOR.*
VALDIE C. SHAW
BY
ATTORNEY July 31, 1951        V. C. SHAW        2,562,746
ADJUSTABLE MITER GAUGE
Filed March 8, 1950        2 Sheets-Sheet 2
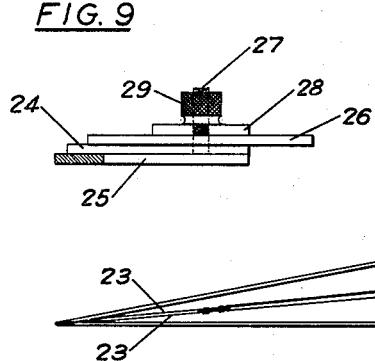
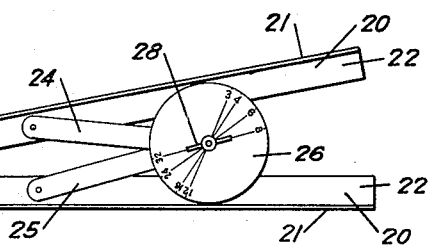
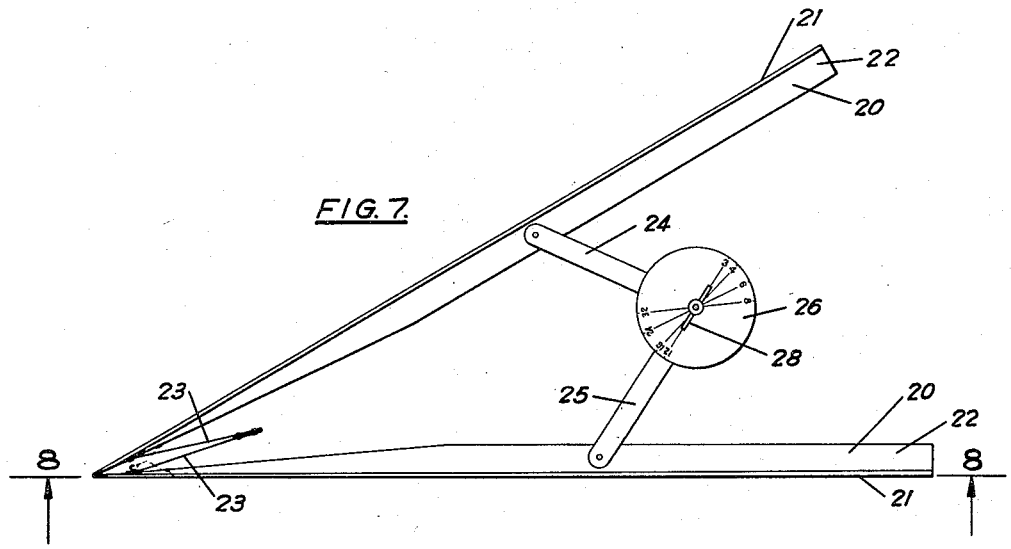
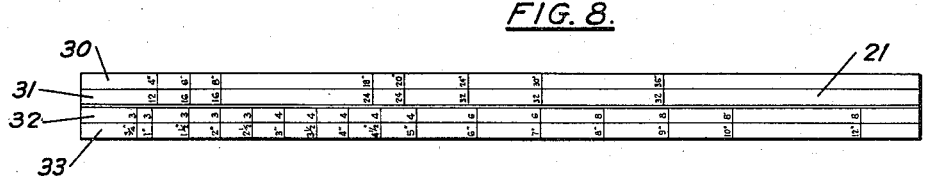
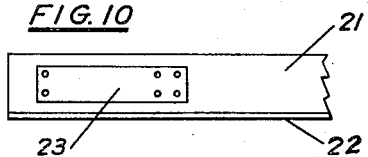
*INVENTOR.*
VALDIE C. SHAW
BY
ATTORNEY Patented July 31, 1951

2,562,746

UNITED STATES PATENT OFFICE 2,562,746

ADJUSTABLE MITER GAUGE

Valdie C. Shaw, Nederland, Tex.

Application March 8, 1950, Serial No. 148,439

2 Claims. (Cl. 33—91)

This invention concerns an adjustable template or pattern for use in cutting molded insulating material to form angular pieces of equal size and shape suitable for application to curved pipe surfaces.

Molded insulating material for use as pipe covering is available in the form of short semi-cylindrical sections of different sizes as well as in the form of boards or slabs. The semi-cylindrical sections, employed in pairs, may be applied directly to straight sections of pipe. Alternatively, the boards or slabs may be cut to form elongated pieces of angular cross section which, when applied longitudinally to the pipe, complement each other to surround the pipe. Precast sections of insulating material are available for use in connection with certain factory made tube turns. Ordinarily, however, it is more expeditious and less expensive to cut the insulating material in the field to fit the pipe, using materials readily at hand. In insulating curved sections of pipe, including factory made L's as well as other pipe bends, it is customary to cut the semi-cylindrical sections to form angular pieces which complement each other to surround the curved section of pipe.

The cutting of molded insulating material for application to curved pipe surfaces, as above described, ordinarily is accomplished by trial and error. The craftsmen who do this work are not necessarily skilled mathematicians, and no simple tools are now available which will permit such work to be done in a precise manner. This results in poor workmanship as well as waste of materials. The molded insulating material often is cut to fit the pipe only approximately, and the intervening space is filled with insulating material of plastic form. This is sometimes undesirable, particularly when insulating against cold.

It is an object of the invention to provide an adjustable template or pattern particularly adapted for use in cutting boards or slabs of insulating material to form elongated, angular pieces adapted to be placed around straight sections of pipe as above described.

It is also an object of the invention to provide an adjustable template or pattern particularly adapted for use in cutting semi-cylindrical sections of insulating material to form angular pieces adapted to be placed around curved sections of pipe.

It is a further object of the invention to incorporate in a single template or pattern a convenient tool suitable for use in cutting insulating material to fit straight sections of pipe as well as curved sections.

Another object of the invention is to incorporate in a single template or pattern a tool suitable for use in cutting insulating material for various sizes of pipe.

In my copending application, Serial No. 144,287, filed February 15, 1950, I have described and claimed a template for cutting semi-cylindrical sections as well as boards or slabs of molded insulating material to form angular pieces of equal size and shape for application to curved pipe surfaces, comprising a planular member having the shape of an isosceles triangle, the two equal sides of the triangle forming guide lines adapted for use in marking the insulating material preparatory to cutting it, the template including one or more guide lines parallel to the base of the triangle adapted for use in positioning the template with respect to the insulating material, the distance of each of the last mentioned guide lines from the apex of the triangle being equal to the radius of a curve corresponding to the outermost extremity of a curved pipe surface in connection with which the insulating material is intended to be used.

The invention described in my copending application, above referred to, contemplates providing a series of templates, the size of each such template being determined by the number of angular pieces required to complete a circle or a 90 degree bend, as the case may be. It is an object of the present invention to provide a single, adjustable template which is adapted for general use, for the purposes described.

The invention will be readily understood by referring to the following description and the accompanying drawing, in which:

Fig. 1 illustrates a method of applying molded insulating material to a curved section of pipe as above described.

Fig. 2 illustrates a method of applying molded insulating material to a straight section of pipe as above described.

Fig. 3 illustrates a method of cutting a semi-cylindrical section of insulating material to form angular pieces adapted to be placed around a curved section of pipe as shown in Fig. 1, using a template embodying the invention.

Fig. 4 is an end view of the semi-cylindrical section of insulating material shown in Fig. 3.

Fig. 5 illustrates a method of cutting a board or slab of insulating material to form elongated, angular pieces adapted to be placed around a straight section of pipe as shown in Fig. 2, using a template embodying the invention.

Figs. 6 and 7 are top views of a template embodying the invention, showing the template in two different positions.

Fig. 8 is a side view of the template shown in Figs. 6 and 7, taken on the line 8—8 of Fig. 7.

Figs. 9 and 10 are fragmentary views illustrating portions of the apparatus.

Referring to Fig. 1 of the drawing, the numeral 1 indicates a 90 degree factory made L. Such L's are made to specifications which have become more or less standardized. They are available in different sizes and angles, and are characterized by relatively short radii as compared with pipe bends which are made in the field from ordinary pipe. The invention is also applicable to the insulation of pipe bends made from ordinary pipe, which likewise have become standardized.

The numerals 2 indicate angular pieces which have been cut from a semi-cylindrical section of molded insulating material as hereinafter described. The pieces 2 are of equal size and complement each other to surround the tube turn 1. It will be understood that the pieces 2 are employed in pairs, and that in the embodiment shown a total of 16 pieces are required to cover both sides of the tube turn 1. Any number of pieces 2 may be used, the use of more pieces being desirable in connection with the larger sizes of pipe.

Lines 3, drawn along two sides of the angular pieces 2, intersect at a point 4 and, in conjunction with lines 5, drawn along the inner wall of the angular pieces 2 adjacent the outermost extremity of the L 1, form isosceles triangles. The point 4, which is the apex of each of the triangles, is also the center of an arc 6 drawn about the outermost extremity of the tube turn 1. The lines 5, which are the bases of the triangles, intersect the arc 6 tangentially and are perpendicular to the radius thereof at the points of intersection. The radius of the arc 6 coincides with the altitude of the triangles, and the lines 3, in conjunction with the arc 6, form segments of 11 degrees 15 minutes each.

Referring to Fig. 3 of the drawing, the numeral 7 indicates a semi-cylindrical section of molded insulating material. This material is available in short lengths, usually not more than 36 inches long. Lines 8 extend diagonally across the semi-cylindrical section 7 and indicate the method of marking the semi-cylindrical section 7 and cutting it to form angular pieces similar to the pieces 2 as shown in Fig. 1.

The numeral 9 indicates generally a template or pattern embodying the invention. The template 9, as hereinafter described, includes a pair of elongated side members which are pivotally connected adjacent one end and spaced apart at the opposite end. The template 9 is laid diametrically across the semi-cylindrical section 7 for use as a guide in marking the lines 8 thereon and as a guide for the saw used in cutting the insulating material. The side members of the template 9 form two sides of an isosceles triangle and correspond to the lines 3 shown in Fig. 1. The angle adjacent the apex of the triangle measures 11 degrees 15 minutes. The base of the triangle is formed by a line 10 drawn along the inner wall of the semi-cylindrical section 7 opposite the apex of the triangle. The line 10 corresponds to the lines 5, as shown in Fig. 1, and the position of the template 9 with respect to the line 10 is determined by the radius of the arc 6 corresponding to the outermost extremity of the L 1.

The invention contemplates use of the template 9 in connection with the cutting of insulating material to fit L's and pipe bends of various sizes. This is accomplished by marking the side members of the template 9 to indicate the corresponding positions of the template 9 with respect to the line 10.

Referring to Fig. 2 of the drawing, the numeral 11 indicates a straight section of pipe, as viewed in cross section, and the numerals 12 indicate a plurality of elongated pieces of molded insulating material of angular cross section, as viewed from the ends thereof. The pieces 12 are applied longitudinally to the pipe 11 and complement each other to surround the pipe 11. As shown, there are 16 of the pieces 12, all of them being of the same size. Any number of pieces 12 may be used, the use of more pieces being desirable in connection with the larger sizes of pipe.

Lines 13, drawn along two sides of the pieces 12, intersect at a point 14 and, in conjunction with lines 15, drawn along one side of the pieces 12 adjacent the circumference of the pipe 11, form isosceles triangles. The point 14, which is the apex of each of the triangles, is also the center of a circle 16 drawn about the circumference of the pipe 11. The lines 15, which are the bases of the triangles, intersect the circle 16 tangentially and are perpendicular to the radius thereof at the points of intersection. The radius of the circle 16 coincides with the altitude of the triangles, and the lines 13, in conjunction with the circle 16, form segments of 22 degrees 30 minutes each.

Referring to Fig. 5 of the drawing, the numeral 17 indicates a board or slab of molded insulating material as viewed from one end thereof. This material is available in short lengths, usually not more than 36 inches long and in widths of from 6 to 18 inches. Lines 18 extend diagonally across the end of the board or slab 17 and indicate the method of marking the board or slab 17 and cutting it to form elongated, angular pieces similar to the pieces 12 as shown in Fig. 2.

The template 9, above referred to, is laid transversely across the end of the board or slab 17 for use as a guide in marking the lines 18 thereon. The side members of the template 9 form two sides of an isosceles triangle and correspond to the lines 13 shown in Fig. 2. The angle adjacent the apex of the triangle measures 22 degrees 30 minutes. The base of the triangle is formed by a line 19 drawn along one side of the board or slab 17 adjacent the apex of the triangle. The line 19 corresponds to the lines 15 as shown in Fig. 2, and the position of the template 9 with respect to the line 19 is determined by the radius of the circle 16 corresponding to the circumference of the pipe 11.

The invention contemplates use of the template 9 in connection with the cutting of insulating material to fit pipe of various sizes. This is accomplished by marking the side members of the template 9 to indicate the corresponding positions of the template 9 with respect to the line 19.

Referring to Figs. 6 to 10, inclusive, the template 9 includes a pair of elongated side members 20 which are pivotally connected adjacent one end and spaced apart at the other end. The side members 20 may be made of angle iron, for example, and each of them has a vertically extending portion 21 and a horizontally extending portion 22. The side members 20 are pointed at their adjacent ends and form two sides of an isosceles triangle. The side members 20 are pivotally connected adjacent one end by a hinge comprising a pair of relatively thin, flat, elongated connecting members 23. The connecting members 23 are flexible and may be made of spring steel, for example. The connecting members 23 are fastened together at one end and each of them is secured at the other end to one of the side members 20.

The side members 20 are connected intermediate their ends by connecting links 24 and 25. The connecting links 24 and 25 are pivotally secured to each other at one end and each of them is pivotally secured at the other end to one of the side members 20.

A disc 26 is rigidly secured to the uppermost connecting link 24. A pin 27, which pivotally connects the links 24 and 25, is rigidly secured to the lowermost connecting link 25 and extends upwardly thru the center of the disc 26. The upper end of the pin 27 is slotted to receive a pointer 28 and threaded to receive a nut 29.

The pointer 28 is aligned with the center line of the lowermost connecting link 25, and the disc 26 is calibrated to indicate the position of the disc 26 with respect to the pointer 28 as the ends of the side members 20 are advanced and retracted with respect to each other to vary the size of the adjacent angle. The calibrations of the disc 26 correspond to the number of segments required to complete a circle or a 90 degree bend when the side members 20 are in the relative positions indicated.

The side members 20 are calibrated as shown in Fig. 8 to indicate the relative positions of the template 9 with respect to the insulating material, when performing the two types of operations illustrated in Figs. 3 and 5, above described, and when operating upon different sizes of pipe and forming different numbers of angular pieces to complete a circle or a 90 degree bend. The calibrations appearing on the side members 20 are arranged in four parallel rows, numbered 30, 31, 32 and 33, and consist of a number of transverse lines which are spaced longitudinally with respect to the side members 20. The calibrations appearing in rows 30 and 31 are for use in cutting boards or slabs of insulating material to form elongated, angular pieces adapted to be placed around straight sections of pipe, as illustrated in Fig. 5. Legends appearing in row 30 indicate the desired position of the template with respect to the insulating material when cutting insulating material for a given size of pipe, and corresponding legends appearing in row 31 indicate the number of angular pieces required to complete a circle. The calibrations appearing in rows 32 and 33 are for use in cutting semi-cylindrical sections of insulating material to form angular pieces adapted to be placed around curved sections of pipe, as illustrated in Fig. 2. Legends appearing in row 33 indicate the desired position of the template with respect to the insulating material when cutting insulating material for a given size of pipe, and corresponding legends appearing in row 32 indicate the number of angular pieces required to complete a 90 degree bend. It will be observed that, as shown in Fig. 5, the template 9 is turned over so that the indicia appearing along the upper edges of the side members 20 is positioned immediately adjacent the insulating material.

The invention may be modified in various ways without departing from the spirit and scope thereof.

I claim:

1. An adjustable template comprising a pair of elongated side members pivotally connected adjacent one end and spaced apart at the opposite end, the side members forming two sides of an isosceles triangle and being pivotally connected adjacent one end by a hinge comprising a pair of relatively thin, flat, elongated flexible connecting members, the connecting members being fastened together at one end and each of them being secured at the other end to one of the side members, the side members being movable pivotally with respect to each other whereby the size of the adjacent angle may be varied, means for indicating when the size of the adjacent angle approximates one or more predetermined sizes, and means for retaining the side members in any desired position with respect to each other, the side members being calibrated to indicate the position of the bases of one or more isosceles triangles having two sides formed by the side members, the altitude of each of the triangles being predetermined.

2. An adjustable template comprising a pair of elongated side members pivotally connected adjacent one end and spaced apart at the opposite end, the side members forming two sides of an isosceles triangle and being pivotally connected adjacent one end by a hinge comprising a pair of relatively thin, flat, elongated flexible connecting members, the connecting members being fastened together at one end and each of them being secured at the other end to one of the side members, the side members being movable pivotally with respect to each other whereby the size of the adjacent angle may be varied, the side members being connected intermedaite their ends by a pair of connecting links, the connecting links being pivotally secured to each other at one end and each of them being pivotally secured at the other end to one of the side members, a disc rigidly secured to one of the connecting links, a pin connecting the two links and rigidly secured to one of them, the pin extending thru the center of the disc, and a pointer secured to the pin, the disc being calibrated to indicate when the size of the adjacent angle formed by the side members, as reflected by the relative positions of the connecting links, approximates one or more predetermined sizes and the side members being calibrated to indicate the position of the bases of one or more isosceles triangles having two sides formed by the side members, the altitude of each of the triangles being predetermined.

VALDIE C. SHAW.

REFERENCES CITED

The following references are of record in the file of this patent:

UNITED STATES PATENTS

| Number | Name | Date |
|---|---|---|
| 615,806 | Clymer | Dec. 13, 1898 |
| 704,263 | Luck | July 8, 1902 |
| 785,756 | Nutz | Mar. 28, 1905 |
| 861,581 | Field et al. | July 30, 1907 |
| 1,325,606 | Balatti | Dec. 23, 1919 |
| 1,966,110 | Woods | July 11, 1930 |

FOREIGN PATENTS

| Number | Country | Date |
|---|---|---|
| 377,265 | Germany | June 13, 1923 |
| 825,448 | France | Dec. 8, 1937 |